(12) United States Patent
Matsui

(10) Patent No.: US 7,075,872 B2
(45) Date of Patent: Jul. 11, 2006

(54) OBJECTIVE LENS SUPPORTING APPARATUS AND OPTICAL PICKUP

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 247 days.

(21) Appl. No.: 10/263,687

(22) Filed: Oct. 4, 2002

(65) Prior Publication Data

US 2003/0072244 A1    Apr. 17, 2003

(30) Foreign Application Priority Data

Oct. 12, 2001    (JP)    ............................ P2001-315917

(51) Int. Cl.
*G11B 7/08*    (2006.01)

(52) U.S. Cl. ............................... 369/53.19; 369/44.32; 720/674

(58) Field of Classification Search ............. 369/53.19, 369/44.32; 720/674
See application file for complete search history.

(56) References Cited

U.S. PATENT DOCUMENTS

| | | | | |
|---|---|---|---|---|
| 5,430,699 | A * | 7/1995 | Matsubara et al. | 369/44.32 |
| 6,449,229 | B1 * | 9/2002 | Kim et al. | 369/53.19 |
| 6,466,529 | B1 * | 10/2002 | Kim et al. | 369/44.32 |
| 6,621,618 | B1 * | 9/2003 | Kaaden et al. | 359/298 |
| 6,724,696 | B1 * | 4/2004 | Kim et al. | 369/44.16 |
| 2002/0006090 | A1 * | 1/2002 | Kawano | 369/44.32 |
| 2002/0009032 | A1 * | 1/2002 | Tsukuda et al. | 369/53.19 |
| 2002/0027841 | A1 * | 3/2002 | Tanaka | 369/44.23 |

FOREIGN PATENT DOCUMENTS

| | | |
|---|---|---|
| JP | 6-223393 | 8/1994 |
| JP | 8-7303 | 1/1996 |
| JP | 08-180441 | 7/1996 |
| JP | 09-044879 | 2/1997 |
| JP | 09-305996 | 11/1997 |
| JP | 9-306003 | 11/1997 |
| JP | 10-143886 | 5/1998 |
| JP | 10-162394 | 6/1998 |

OTHER PUBLICATIONS

Translation of JP 08-180441 provided by Japanese Patent Office website.*

* cited by examiner

*Primary Examiner*—William Korzuch
*Assistant Examiner*—Michael V. Battaglia
(74) *Attorney, Agent, or Firm*—Morgan, Lewis & Bockius LLP

(57) ABSTRACT

An objective lens supporting apparatus of an optical pickup includes a lens frame in which an objective lens is mounted; receiving member for receiving driving forces for displacing the objective lens in the direction of the optical axis and in a direction perpendicular to the optical axis is disposed; a support base in which generating member for generating the driving forces is disposed; an elastic member W extended from the support base and fixed to the lens frame for swingably supporting the lens in a cantilevered manner; and a tilting member for inclining the optical axis of the objective lens with respect to the support base by tilting the lens frame.

9 Claims, 4 Drawing Sheets

OBJECTIVE LENS SUPPORTING APPARATUS AND OPTICAL PICKUP

BACKGROUND OF THE INVENTION

1. Field of the Invention

This invention relates to an objective lens supporting apparatus of an optical pickup for recording information on and reproducing information from a recording medium such as optical disks including a compact disk (CD), a digital versatile disk (DVD), a laser disk (LD), a magnetic optical disk (MO), and a mini disk (MD).

2. Description of the Related Art

An optical pickup for optically reading information recorded on a disk type medium such as a compact disk (CD) or a digital versatile disk (DVD), and for outputting the read information as an electric signal conventionally includes an objective lens supporting apparatus. The objective lens supporting apparatus is operated in such a way as to follow a motion of the disk.

The objective lens supporting apparatuses are roughly classified into a shaft slide type and a wire support type.

An objective lens supporting apparatus of the shaft slide type has an objective lens attached to a lens frame, and a drive coil attached to a side face of the lens frame. A sliding shaft extending in the direction of an optical axis of the objective lens is fixed to an optical pickup body. The sliding shaft penetrates the lens frame. The lens frame is rotatable about the sliding shaft. The lens frame is displaced around the sliding shaft in order to perform tracking servo control. Further, the lens frame is slid in the direction of the shaft in order to perform focusing servo control.

On the other hand, objective lens supporting apparatuses of the wire support type are disclosed in JP-A-6-223393, JP-A-8-7303, JP-A-9-306003 and JP-A-10-143886. The objective lens supporting apparatus includes a lens frame having an objective lens, a focusing coil and a tracking coil. The lens frame is supported by a wire-like elastic support element on an optical pickup body in a cantilevered manner. A magnetic circuit, which is used for generating magnetic fluxes acting on the focusing coil and the tracking coil and consists of a permanent magnet and a yoke, is provided on the optical pickup body. In this configuration, the objective lens is driven in a focusing direction and a tracking direction by selectively energizing the focusing coil and the tracking coil by the wire-like elastic member in order to perform focusing and positioning on the optical axis.

The rotational speed of a disk such as a CD or a DVD is increasing in accordance with an increase in the read speed or the write speed of a CD drive apparatus or a DVD drive apparatus. Therefore, a high focusing speed and high-speed tracking capability are required.

A lens having a high numerical aperture is often used for an optical disk such as a DVD, on which information is recorded with high density and which has extremely narrow track intervals. In case that the lens having a high numerical aperture is used, the influence of comatic aberrations generated owing to inclination of an optical disk, which is caused by the warpage of the disk itself and the axial runout occurring during the rotation thereof, becomes serious. Thus, there has been increasing need for maintaining the tilt angle of the objective lens and the relative angle of the optical disk in ideal conditions even when the objective lens moves from right to left or up and down in accordance with the rotation of the optical disk for focusing. Also, need for reading information more quickly and accurately is increasing.

However, the aforementioned objective lens supporting apparatus of the sliding shaft type has drawbacks in that the friction resistance is generated between the sliding shaft and the lens frame when the sliding shaft slides and the lens frame rotates therearound. Thus the focusing speed becomes relatively low and the tracking capability becomes poor, and it is difficult to increase the read speed and the write speed to high levels. Since the sliding shaft is passed through the lens frame, it is necessary to incline the sliding shaft in accordance with the inclination of the optical disk to enable the inclination of the objective lens to follow the minute inclination of the optical disk during reading or writing the information in such a way as to make the optical axis of the objective lens perpendicular to the surface of the optical disk. Consequently, the size and the weight of a movable body become large and it becomes difficult to perform high-speed tracking.

On the other hand, the objective lens supporting apparatus of the wire support type as described in the above has a simple structure and a movable body can be configured to be light. Thus, this objective lens supporting apparatus is excellent at the focusing speed and the high speed tracking capability. Consequently, an objective lens supporting apparatus of the wire support type having a drive apparatus for inclining the objective lens in such a way as to follow the inclination of the disk during rotation of the disk to thereby set the optical axis of the objective lens nearly perpendicular to a read face of the disk has been desired.

SUMMARY OF THE INVENTION

An object of the present invention is to provide an objective lens supporting apparatus in which an optical axis of an objective lens is inclined in accordance with the inclination of a read face of an optical disk to enable light to incident perpendicularly on the read face.

According to a first aspect of the invention, there is provided an objective lens supporting apparatus of an optical pickup for focusing and positioning a light beam spot onto a disk type medium being recorded information to be optically read, comprising: an objective lens; a lens frame on which the objective lens is attached, the lens frame having a receiving member which receives a driving forces for displacing the objective lens in a direction of an optical axis thereof and in a direction perpendicular to the optical axis; a support base; two pairs of upper and lower wire-like elastic members arranged left side and right side respectively, each wire-like elastic member being extended from the support base and fixed to the lens frame and adapted to support the lens frame in a cantilevered manner so as to permit the lens frame to swing; a pair of magnets disposed on the support base at a predetermined interval and opposed to each other so that the lens frame is interposed therebetween; and a coil part being interposed between the pair of magnets and fixed to the lens frame and adapted to tilt the lens frame by being energized so as to incline the optical axis of the objective lens with respect to the support base, wherein the left side and right side wire-like elastic members are disposed in such a way as to converge toward the lens frame, and wherein the coil part comprises a pair of coils attached to both side parts of the lens frame, which are respectively opposed to the pair of magnets, in such state where the pair of coils project downwardly from the lens frame and opposed to each other.

According to the invention, the lens frame having the objective lens is swingably supported on the support base via the elastic support member. Further, in addition to the receiving member which receives driving forces for displacing the objective lens in a direction of an optical axis thereof and in a direction perpendicular to the optical axis, a pair of coils interposed between the pair of magnets of the support base and adapted to tilt the lens frame by being energized so as to incline the optical axis of the objective lens with respect to the support base is provided on the lens frame. Thus, the lens frame is caused to follow the inclination of the optical disk, which occurs during rotation of the optical disk or by the warpage of the optical disk, to thereby enable the optical axis of the light beam, which incident onto the read face of an optical disk, to be nearly perpendicular at all times. Consequently, the positioning and focusing of the beam spot can be accurately performed.

Therefore, even when a lens such as a high-numerical-aperture lens seriously affected by the inclination of the optical disk is used as the objective lens for a high-recording-density optical disk such as a DVD, the objective lens can be always placed horizontally to the optical disk. Consequently, occurrences of troublesome aberrations such as a coma aberration can be prevented. Moreover, accurate reading of information can be performed.

Further, since the pair of coils is disposed between the magnets and attached to the lens frame, the lens frame itself can be inclined with respect to a focusing direction. Thus, as compared with an apparatus constructed in such a way as to incline an optical pickup itself in accordance with the incline of the optical disk, the configuration of the objective lens supporting apparatus can be simplified. Moreover, the weight of the apparatus can be reduced. Furthermore, because the lens frame, that is, the objective lens itself provided in the lens frame can be tilted by energizing the pair of coils disposed between the pair of magnets of the support base, it is unnecessary to provide constituent elements other than the pair of coils on the lens frame itself. Therefore, the operation of inclining the lens frame in such a way as to follow the inclination of the optical disk can be performed at a high speed.

Furthermore, according to the invention, the coil part may be constituted by two coils respectively disposed at an upper portion of one of both side parts of the lens frame so as to protrude upwardly from the lens frame, and at a lower portion of the other side part of the lens frame so as to protrude downwardly from the lens frame, in such a way as to opposed to each other diagonally across the lens frame.

DETAILED DESCRIPTION OF THE PREFERRED EMBODIMENTS

An objective lens supporting apparatus 1, which is an embodiment of the invention, is described in detail with reference to the accompanying drawings.

Figure 1:
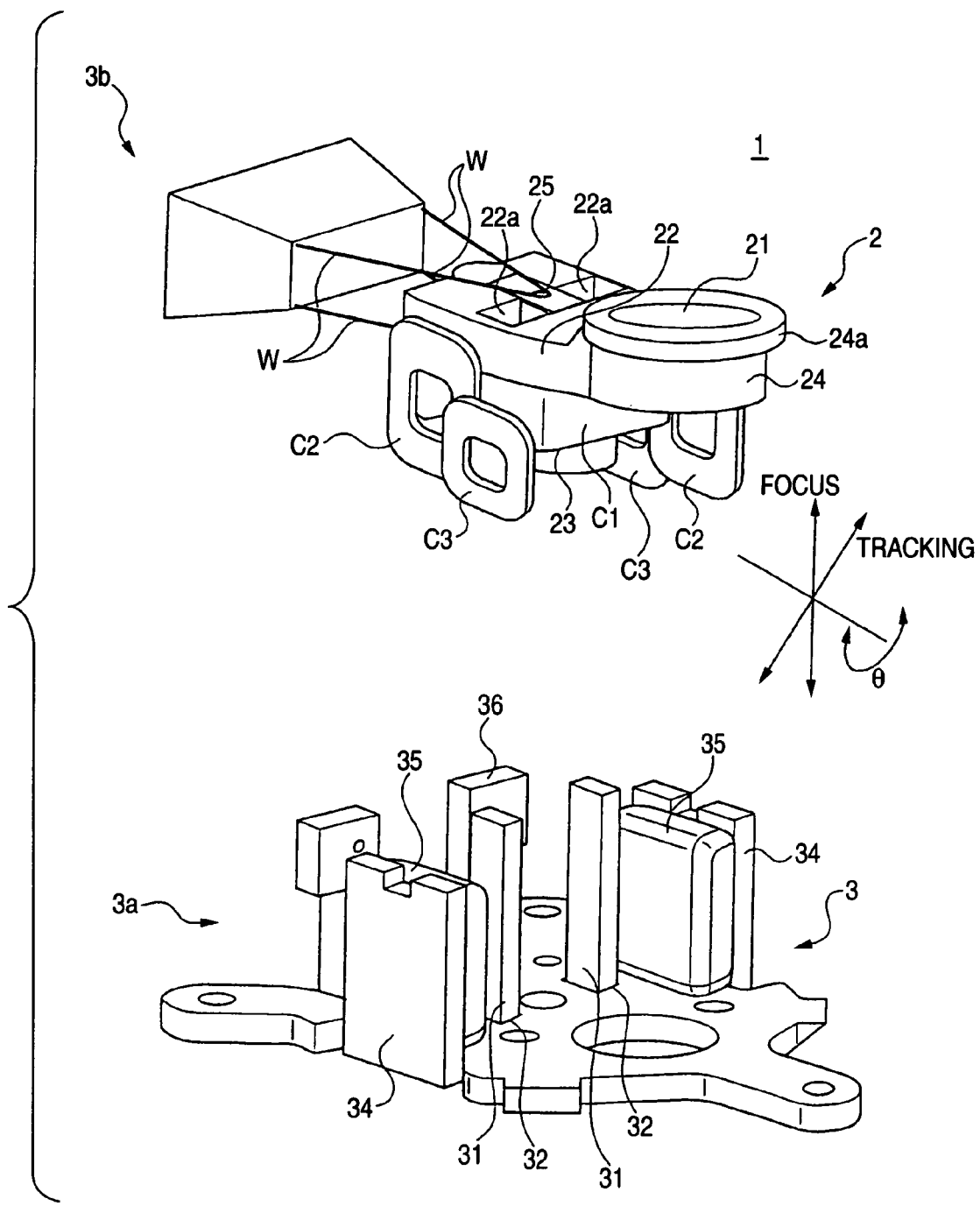
FIG. 1 is a perspective view showing a primary part of an objective lens supporting apparatus of an embodiment of the invention.
Figure 2:
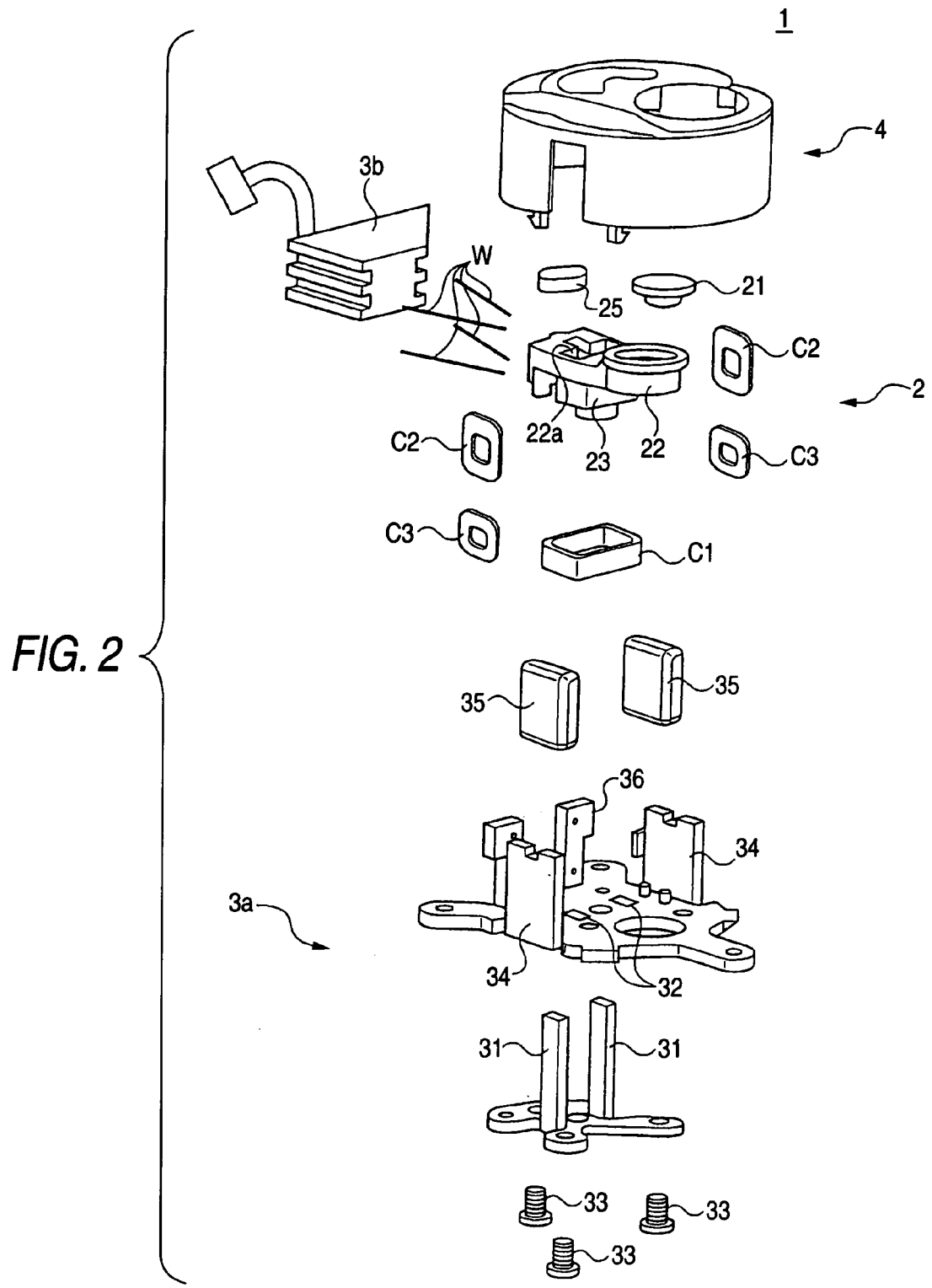
FIG. 2 is an exploded perspective view showing the objective lens supporting apparatus.

As illustrated in FIGS. 1 and 2, the objective lens supporting apparatus 1 forms a part of an optical pickup for focusing and positioning of a light beam LB to an optical disk 100 (see FIG. 3), on which information is optically readably recorded. The objective lens supporting apparatus 1 includes a lens frame 2 having an objective lens 21 and three kinds of coils C1, C2, and C3 serving as a receiving member which receives driving forces for focusing and positioning of the objective lens 21, a support base 3 having a magnetic circuit serving as a generating member for generating the driving forces, four wire-like elastic members (two pairs of upper and lower wire-like elastic members) W for supporting the lens frame 2 on the support base 3 in a cantilevered manner so as to swing the lens frame 2, and a cover part 4 for covering these constituent elements from above.

The support base 3 includes a base part 3a, which composes the magnetic circuit, and a support part 3b, to which an end of each of the wire-like elastic members W for supporting the lens frame 2 on the support base 3 in a cantilevered manner is fixed. The lens frame 2 is placed above a bottom surface part of the base part 3a, as shown in FIGS. 1 and 2.

The base part 3a is constituted by a member made by using an iron material as abase material. The iron material is formed by sheet metal forming or lost-wax molding. The bottom surface of the base part 3a is placed nearly in parallel to an information recording face of the optical disk 100. Magnet yokes 31 composing the magnetic circuit are inserted through insertion parts 32 formed in the bottom surface portion of the base part 3a, and fixed by screws 33. Further, side wall parts 34 protrude from the bottom surface portion of the base part in such a manner as to face each other across the swingable lens frame 2 at a predetermined interval. A pair of drive magnets 35 are respectively fixed to the side wall parts 34 such that the three kinds of coils C1, C2, and C3 of the lens frame 2 are interposed therebetween. The magnetic circuit comprises the base part 3a, the magnetic yokes 31, and the pair of drive magnets 35.

The support part 3b is fitted to a wall part 36, which protrudes upwardly from an end portion of the base part 3a. The wall part 36 has a recessed portion to which the support part 3b is fitted. A base end part (one end part) of each of wire-like elastic members W is fixed to the support part 3b, while a leading end part (the other end part) is fixed to the lens frame 2.

Each of the two pairs of upper and lower wire-like elastic members W is made of, for example, an alloy of beryllium and copper and constituted by a wire having a diameter of about 0.1 mm. A leading end part of each of the wire-like elastic members W is soldered to stationary members 25 attached onto the top and bottom portions of a nearly central part of a plate-like lens frame body 22 so that the left side and right side wire-like elastic members W of each of the pairs are converged to the leading end side thereof in a horizontal state.

That is, among the wire-like elastic members W, the wire-like elastic members W to be arranged laterally in a horizontal state are provided so that the horizontal sections of the elastic members W are arranged like an isosceles triangle, whose base is a segment connecting the base end parts thereof to each other in a plan view.

Thus, the lens frame 2 is supported on the support base 3 via the wire-like elastic members W, which are attached to the support part 3b fixed to the base part 3a, in a cantilevered manner in such a way as to be able to swing from side to side and up and down.

Further, the two pairs of upper and lower wire-like elastic members W serve not only as the members for supporting the lens frame 2 but also as electric supply lines for supplying electric power to coils C1, C2 and C3 attached to the lens frame 2.

The support part 3b has a gel-like member serving as a damping member. A flexible substrate for connecting power wires to the wire-like elastic members W is provided on a rear side of the gel-like member.

The lens frame 2 has the lens frame body 22, to which the leading part of each of the wire-like elastic members W is fixed, a lens holder 24 formed integrally with the lens frame body 22 and attached in a state in which the objective lens 21 is fitted thereinto, and a coil attaching part 23 formed integrally with a lower part of the lens frame body 22. The coils C1, C2, and C3 are attached to the coil attaching part 23.

The stationary members 25, to each of which the leading parts of the corresponding wire-like elastic members W are fixed by soldering, are provided on the top surface of the nearly central part of the lens frame body 22 and on the bottom surface of the coil attaching part 23, respectively. These stationary members 25 are arranged on the same vertical line. Insertion holes 22a, into which the magnet yokes 31 are inserted, are provided in both side parts of each of these stationary members 25 in such a way as to penetrate through the lens frame body 22 and the coil attaching part 23. The coil attaching part 23 is formed like a rectangular cylinder in such a manner as to involve the two insertion holes 22a.

As shown in FIGS. 1 and 2, the lens holder 24 has a cylindrical part 24a, into which the objective lens 21 is fitted, and is formed integrally with the lens frame body 22 so that the lens holder 24 and the support part 3b are placed in opposite sides with respect to the stationary member 25. The support part 3b, the stationary member 25, and the lens holder 24 are aligned nearly on the same line. The lens frame 2 swings around the stationary member 25 from side to side and up and down. As the lens frame 2 swings, the objective lens 21 swings around the stationary member 25 from side to side and up and down.

Figure 4:
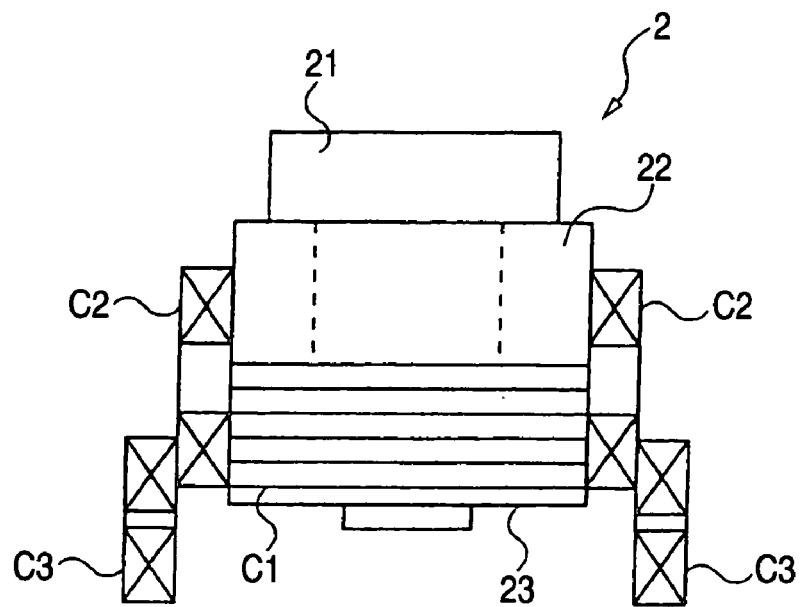
FIG. 4 is a front view showing the objective lens supporting apparatus.

As illustrated in FIGS. 1, 2, and 4, the three kinds of coils are attached to this coil attaching part 23. That is, a focusing coil C1 for moving the objective lens 21 in the direction of the optical axis of the light beam LB together with the lens frame 2, a tracking coil C2 for moving the objective lens 21 in a direction perpendicular to the direction of the optical axis of the light beam LB together with the lens frame 2, and a tilting coil C3 for tilting the optical axis by inclining the objective lens 21 together with the lens frame 2 are attached to this coil attaching part 23.

As shown in FIG. 2, the focusing coil C1 is constituted by a rectangular coil, which is wound nearly like a rectangle, and attached to the coil attaching part 23 in such a way as to be fitted thereonto from below, and wound in such a manner as to surround the stationary member 25, as viewed in a plan view.

The focusing coil C1 is interposed between the drive magnets 35, 35 of the magnetic circuit, and receives an action of a magnetic flux, which is generated by the magnetic circuit, by being energized. Further, according to Fleming's left hand rule, the focusing coil C1 moves the lens frame 2 and the objective lens 21 fixed to the lens frame 2, in the direction of the optical axis of a light beam LB so as to focus a light beam spot.

As illustrated in FIGS. 1 and 4, each of a pair of the tracking coils C2 wound like flat rectangular coils in a direction perpendicular to the direction, in which the focusing coil C1 is wound. The tracking coils are fixed in such a manner as to be adjacent to the focusing coil C1 and are disposed between this focusing coil C1 and a corresponding one of the drive magnets 35. These tracking coils C2 are placed between the drive magnets 35 diagonally across the lens frame, which is provided around the stationary member 25, as viewed in a plan view. Further, each of end parts of the tracking coils C2 projects from a side face adjoining the side face, to which the corresponding tracking coil C2 is attached. Thus, the tracking coils C2 can swing the lens frame body 22 around the stationary member 25 nearly in a horizontal direction according to Fleming's left hand rule by being energized and receiving the action of a magnetic flux generated by the magnetic circuit. Consequently, the objective lens 21 attached to the lens frame body 22 via the lens holder 24 can be moved in tracking direction, that is, a direction perpendicular to the optical axis of the light beam LB. Thus, when information recorded on the optical disk 100 is read, the position of the light beam spot in the direction of a track can be accurately determined. Since the tracking coils C2 are provided between the drive magnets 35 in such a manner as to sandwich the focusing coil C1, the lens frame 2 can swing horizontally in a balanced manner when the. lens frame 2 swings in a horizontal direction around the stationary member 25.

Each of the tilting coils C3 is constituted by a coil wound in the form of a flat rectangular coil, and fixed to a side face portion of the coil attaching part 23, which faces a corresponding one of the drive magnets 35, so that the tilting coils C3 sandwich the focusing coil C1 and the tracking coils C2 and are placed between the drive magnets 35. Each of the tilting coils C3 is attached at the outer face side of a corresponding one of the tracking coils C2 so that the direction of winding a copper wire is perpendicular to the winding direction of the focusing coil C1 in a state in which the tilting coils C3 protrude downwardly from the coil attaching part 23 of the lens frame 2.

These tilting coils C3 receive the driving forces for tilting the lens frame 2 and making the light beam LB impinge perpendicularly upon the read face of the optical disk 100 such that the optical axis of the objective lens 12 to follow the inclination of the optical disk 100, that is, by inclining the optical axis of the light beam LB in accordance with the inclination of the optical disk 100, from which information is read by being irradiated with light beams LB through the objective lens 21. The inclination of the optical disk 100 is caused by an axial runout occurred when the optical disk 100 is rotated by a spindle motor 101 or by the warpage of the optical disk 100 itself.

Similarly with the focusing coil C1 and the tracking coils C2, the tilting coils C3 rotate the lens frame 2 in the direction θ shown in FIG. 1 by being energized and receiving the action of the magnetic flux generated by the magnetic circuit. Since the tilting coils C3 are respectively placed on both opposed sides of the focusing coil C1 in such a manner as to face the drive magnets 35, the lens frame 2 can rotate in a balanced manner when the frame 2 is rotated in the direction θ. Thus, the tilting member for inclining the optical axis of the objective lens 21 with respect to the support base 3 is constituted by the tilting coils C3, the magnetic circuit, and the wire-like elastic members W serving as the electric supply lines.

Next, an operation of the objective lens supporting apparatus 1 according to this embodiment is described.

When the tracking coils C2 are energized through the wire-like elastic members W under the control of an optical pickup control apparatus (not shown), a horizontal driving force is generated by the action of the tracking coils C2 and the drive magnets 35. Thus, a tracking operation of positioning the light beam spot onto a desired track on the optical disk 100 is performed. Since the tracking coils C2 are placed between the drive magnets 35 diagonally across the lens frame provided around the stationary member 25 in a plan view thereof, the lens frame 2 performs a movement similar to the rotational movement around the stationary member 25 by a predetermined angle. Consequently, the positioning of the light beam spot in a direction perpendicular to the alignment of the optical axis of the objective lens 21, that is, the positioning in the tracking direction can be performed.

Furthermore, when the focusing coil C1 is energized, a driving force in a perpendicular direction is generated by the action of the focusing coil C1 and the drive magnets 35 according to Fleming's left hand rule. At that time, the lens frame body 22 performs a vertical movement between the pair of drive magnets 35 by being guided by the yokes 32, because the yokes 32 are inserted into the insertion holes 22a. The objective lens 21 moves in the direction of the optical axis of the light beam LB by following this movement of the lens frame body 22. Thus, an operation of focusing the light beam spot is performed.

Thereafter, when a detection part provided in the optical pickup control apparatus (not shown) detects the inclination of the optical disk 100, which is caused by an axial runout of the optical disk 100 due to rotation of the spindle motor 101 and by the warpage of the optical disk 100, the objective lens 3 is tilted by energizing the tilting coils C3 to thereby turn the lens frame 2 by the predetermined angle so that the optical axis of the light beam LB becomes perpendicular to the optical disk 100.

Figure 3:
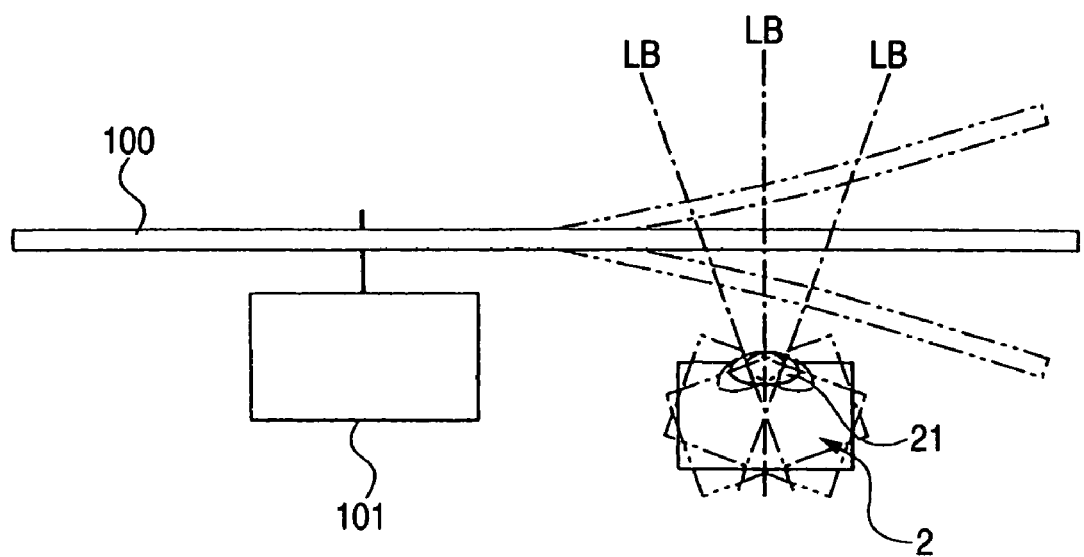
FIG. 3 is a schematic view showing a tilting operation in which an optical axis of an objective lens is inclined by a tilting member in the objective lens supporting apparatus.

According to the objective lens supporting apparatus 1 of this embodiment, the lens frame body 22 having the objective lens 21 is supported by the support base 3 via the wire-like elastic support members W in such a way as to be able to swing between the drive magnets 35 of the support base 3. The pair of tilting coils C3 for tilting the lens frame 2 itself by being energized to thereby incline the optical axis of the objective lens 21 are provided on the lens frame 2 having the lens frame body 22, in addition to the focusing coil C1 and the tracking coils C2. Thus, as illustrated in FIG. 3, the light beam LB can be irradiated nearly perpendicularly to the optical disk 100 at all times by causing the lens frame 2 itself, that is, the objective lens 21 itself to follow the inclination of the optical disk 100, which is the inclination in the direction of a track thereof caused during rotation thereof and due to the warpage of the optical disk 100 itself. Consequently, the positioning and focusing of the spot can be accurately performed.

Therefore, even when a lens having a high numerical aperture, which is seriously affected by signal degradation, is used as the objective lens 21 in an optical disk 100, such as a DVD disk, on which information is recorded with a high density, the objective lens 21 can be placed horizontally to the optical disk 100 at all times. Moreover, the light beam LB can be always made to impinge perpendicularly thereonto. Thus, occurrences of troublesome coma aberrations can be prevented. Consequently, the accurate reading of information can be performed.

Furthermore, the pair of tilting coils C3 are disposed between the pair of drive magnets 35, and attached to the lens frame 2. Thus, as described above, the lens frame 2 itself can be inclined to the focusing direction. Consequently, as compared with the apparatus constructed in such a way as to incline the entire optical pickup, which includes the objective lens supporting apparatus, in accordance with the incline of the optical disk 100, the configuration thereof can be simplified. Moreover, the weight of the apparatus can be reduced. Furthermore, because the lens frame, that is, the objective lens 21 itself provided in the lens frame can be tilted by energizing the pair of tilting coils C3 disposed between the pair of drive magnets 35, which are provided on the support base 3, it is unnecessary to provide constituent elements other than the pair of tilting coils C3 on the lens frame 2 itself to be driven. Therefore, an operation of inclining the lens frame 2 in such a way as to follow the inclination of the optical disk 100 can be performed at a high speed.

The invention is not limited to the aforementioned embodiment. Suitable changes and modifications may be made without departing from the gist of the invention.

In the aforementioned embodiment, the pair of tilting coils C3 are attached to both side parts of the coir attaching part 23 in such a way as to project downwardly from the coil attaching part 23 and opposed to each other, but the invention is not limited thereto.

Figure 5:
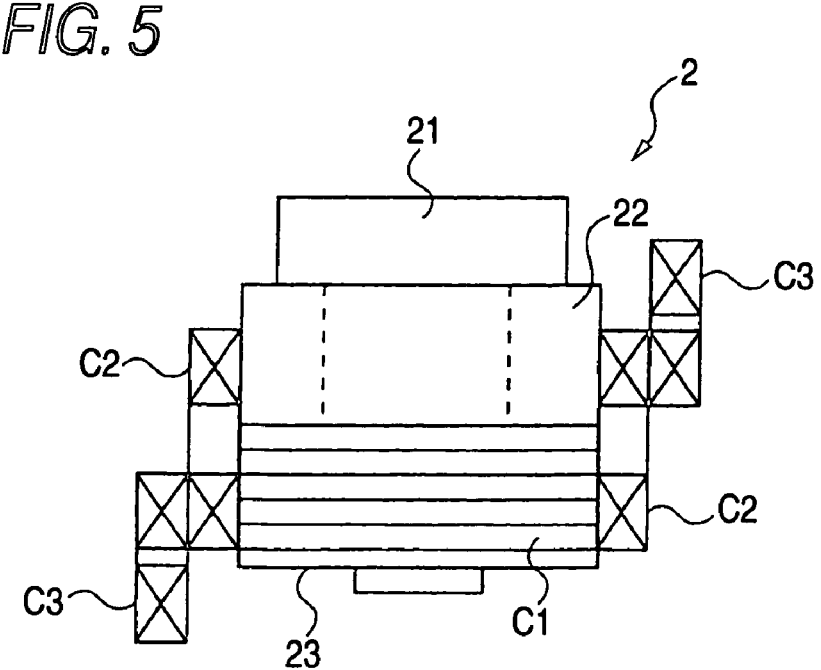
FIG. 5 is a front view showing an objective lens supporting apparatus of another embodiment of the invention.

For example, as illustrated in FIG. 5, one of tilting coils C3 may be attached to the bottom portion of one of both the side parts, which are respectively placed at the sides of the pair of drive magnets 35, in the coil attaching part 23 provided at a lower part of the lens frame body 22 so that the bottom of the one of tilting coils C3 protrudes downwardly therefrom. The other tilting coil C3 may be attached to the top portion of the other side part so that the top of the other tilting coil C3 protrudes upwardly therefrom. As far as the objective lens 3 can be inclined with respect to the support base 3, that is, the objective lens 3 can be tilted by permitting the tilting coil C3 to receive a magnetic force and by rotating the lens frame 2 by energizing the tilting coils C3 in such a way as to follow the inclination of the optical disk 100, any configuration of the apparatus may be employed.

Further, although the above embodiment has a pair of tilting coils C3 respectively provided on both side part of the focusing coil C1 so as to balance the inclination caused by the tilting coils C3, it is possible for the apparatus to have only one tilting coil C3 as long as desired balance can be maintained. Alternatively, as long as desired balance can be maintained, the apparatus may be constructed so that a member for balancing the lens frame 2 to be supported by the wire-like support members W is attached to a predetermined place.

Further, although each of the tilting coils C3 is constituted by a coil wound in the form of a flat rectangular coil in the aforementioned embodiment, the tilting coils C3 of the invention are not limited thereto. That is, as long as an electromagnetic force acting in such a way as to incline the lens frame 2 itself so as to follow the inclination of the optical disk 100 can be obtained, any other configuration of the apparatus may be employed.

According to the invention, a pair of coils for inclining the optical axis of the objective lens with respect to the support base is provided in the objective lens supporting apparatus. Thus, the lens frame itself is caused to follow the inclination of the optical disk, which occurs during rotation of the optical disk and owing to the warpage of the optical disk, to thereby enable the irradiation of light beams to be performed so that the optical axis of the light beam is nearly perpendicularly onto the read face of an optical disk at all times. Consequently, the positioning and focusing of the spot can be accurately performed. Therefore, even when a high-numerical-aperture lens is used as the objective lens in the case of using a high-recording-density optical disk, for example, a DVD, the objective lens can be always placed horizontally to the optical disk. Consequently, occurrences of troublesome aberrations, such as a coma aberration, can be prevented. Moreover, accurate reading of information can be performed.

Further, the pair of coils is disposed between the magnets and attached to the lens frame. Thus, as compared with an apparatus constructed in such a way as to incline an optical pickup itself in accordance with the incline of the optical disk, the configuration of the apparatus can be simplified according to the invention. Consequently, an operation of inclining the lens frame in such a way as to follow the inclination of the optical disk can be performed at a high speed.

What is claimed is:

1. An objective lens supporting apparatus of an optical pickup for focusing and positioning a light beam spot onto a disk type medium being recorded with information to be optically read, comprising:
    an objective lens;
    a lens frame on which the objective lens is attached, the lens frame having a receiving member which receives driving forces for displacing the objective lens in a direction of an optical axis thereof and in a direction perpendicular to the optical axis;
    a support base;
    two pairs of upper and lower wire-like elastic members arranged on a left side and a right side respectively, each wire-like elastic member being extended from the support base and fixed to the lens frame and adapted to support the lens frame in a cantilevered manner so as to permit the lens frame to swing;
    a pair of magnets disposed on the support base at a predetermined interval and opposed to each other on the left side and right side respectively so that the lens frame and the upper and lower wire-like elastic members are interposed therebetween;
    a first coil part being interposed between the pair of magnets and fixed to the lens frame and adapted to tilt the lens frame by being energized so as to incline the optical axis of the objective lens with respect to the support base; and
    a second coil part being interposed between the pair of magnets and fixed to the lens frame,
    wherein the left side and right side wire-like elastic members are disposed in such a way as to converge toward the lens frame,
    wherein the first coil part comprises a pair of first coils attached to both side parts of the lens frame, which are respectively opposed to the pair of magnets, in such state where the pair of first coils project downwardly from the lens frame and oppose each other, and
    wherein the second coil part comprises a pair of second coils attached to the both side parts of the lens frame, the second coils being adjacent to the first coils, respectively, and arranged at different positions with respect to the first coils in the direction of the optical axis.

2. An objective lens supporting apparatus of an optical pickup for focusing and positioning a light beam spot onto a disk type medium being recorded with information to be optically read, comprising:
    an objective lens;
    a lens frame on which the objective lens is attached, the lens frame having a receiving member which receives driving forces for displacing the objective lens in a direction of an optical axis thereof and in a direction perpendicular to the optical axis;
    a support base;
    two pairs of upper and lower wire-like elastic members arranged on a left side and a right side respectively, each wire-like elastic member being extended from the support base and fixed to the lens frame and adapted to support the lens frame in a cantilevered manner so as to permit the lens frame to swing;
    a pair of magnets disposed on the support base at a predetermined interval and opposed to each other on the left side and right side respectively so that the lens frame and the upper and lower wire-like elastic members are interposed therebetween;
    a first coil part being interposed between the pair of magnets and fixed to the lens frame and adapted to tilt the lens frame by being energized so as to incline the optical axis of the objective lens with respect to the support base; and
    a second coil part being interposed between the pair of magnets and fixed to the lens frame,
    wherein the left side and right side wire-like elastic members are disposed in such a way as to converge toward the lens frame,
    wherein the first coil part comprises a pair of first coils attached to both side parts of the lens frame, which are respectively opposed to the pair of magnets, in such state where one of the pair of first coils is attached to a bottom end portion of one of the side parts and projects downwardly from the lens frame and the other of the pair of first coils is attached to a top end portion of the other of the side parts and projects upwardly from the lens frame, and
    wherein the second coil part comprises a pair of second coils attached to the both side parts of the lens frame, the second coils being adjacent to the first coils, respectively, and arranged at different positions with respect to the first coils in the direction of the optical axis.

3. An objective lens supporting apparatus of an optical pickup for focusing and positioning a light beam spot onto a disk type medium being recorded with information to be optically read, comprising:
    an objective lens;
    a lens frame on which the objective lens is attached, the lens frame having a receiving member which receives driving forces for displacing the objective lens in a direction of an optical axis thereof and in a direction perpendicular to the optical axis;
    a support base;
    a support member being extended from the support base and fixed to the lens frame and adapted to support the lens frame in a cantilevered manner so as to permit the lens frame to swing;
    a tilting member for inclining the optical axis of the objective lens with respect to the support base by tilting the lens frame, the tilting member including a pair of first coils attached to both side parts of the lens frame, and a pair of magnets disposed on the support base at a predetermined interval arranged on a left side and a right side respectively; and
    a pair of second coils attached to the both side parts of the lens frame, the second coils being adjacent to the first coils, respectively, and arranged at different positions with respect to the first coils in the direction of the optical axis;
    wherein the support member has wire-like support members arranged on the left side and right side respectively between the pair of magnets.

4. An objective lens supporting apparatus according to claim 3, wherein the tilting member further comprises
a coil part being interposed between the pair of magnets and fixed to the lens frame and adapted to tilt the lens frame by being energized so as to incline the optical axis of the objective lens.

5. An objective lens supporting apparatus according to claim 4, wherein the coil part comprises a pair of coils attached to both side parts of the lens frame, which are respectively opposed to the pair of magnets, in such state where the coils of the pair of coils projects downwardly and oppose each other.

6. An objective lens supporting apparatus according to claim 4, wherein the coil part comprises a pair of coils attached to both side parts of the lens frame, which are respectively opposed to the pair of magnets, in such state where one of the pair of coils is attached to a bottom end portion of one of the side parts and projects downwardly from the lens frame and the other of the pair of coils is attached to a top end portion of the other of the side parts and projects upwardly from the lens frame.

7. An objective lens supporting apparatus according to claim 3, wherein the support member comprises two pairs of upper and lower wire-like elastic members arranged on a left side and a right side respectively, each wire-like elastic member being extended from the support base and fixed to the lens frame,
wherein the left side and right side wire-like elastic members are disposed in such a way as to converge toward the lens frame.

8. An objective lens supporting apparatus according to claim 3, wherein the support member comprises left side and right side wire-like elastic members, each wire-like elastic member being extended from the support base and fixed to the lens frame,
wherein the left side and right side wire-like elastic members are disposed in such a way as to converge toward the lens frame.

9. An optical pickup having an objective lens supporting apparatus for focusing and positioning a light beam spot onto a disk type medium being recorded with information to be optically read, wherein the objective lens supporting apparatus comprises:

an objective lens;

a lens frame on which the objective lens is attached, the lens frame having a receiving member which receives driving forces for displacing the objective lens in a direction of an optical axis thereof and in a direction perpendicular to the optical axis;

a support base;

a pair of magnets disposed on the support base at a predetermined interval and opposed to each other on a left side and a right side respectively so the lens frame is interposed therebetween;

a support member being extended from the support base and fixed to the lens frame and adapted to support the lens frame in a cantilevered manner so as to permit the lens frame to swing;

a tilting member for inclining the optical axis of the objective lens with respect to the support base by tilting the lens frame, the tilting member including a pair of first coils attached to both side parts of the lens frame; and a pair of second coils attached to the both side parts of the lens frame, the second coils being adjacent to the first coils, respectively, and arranged at different positions with respect to the first coils in the direction of the optical axis;

wherein the support member has wire-like elastic members arranged on the left side and right side respectively between the pair of magnets.

* * * * *